United States Patent [19]

Tse-Kai

[11] Patent Number: 4,868,913
[45] Date of Patent: Sep. 19, 1989

[54] SYSTEM OF ENCODING CHINESE CHARACTERS ACCORDING TO THEIR PATTERNS AND ACCOMPANYING KEYBOARD FOR ELECTRONIC COMPUTER

[76] Inventor: Ann Tse-Kai, Block B, 3/F, No. 48, Kadoorie Road, Kowloon, Hong Kong

[21] Appl. No.: 90,058

[22] Filed: Aug. 27, 1987

Related U.S. Application Data

[63] Continuation-in-part of Ser. No. 831,763, Feb. 21, 1986, abandoned.

[30] Foreign Application Priority Data

Apr. 1, 1985 [CN] China ................................. 85101817

[51] Int. Cl.[4] .............................................. G09G 3/02
[52] U.S. Cl. .................................................... 340/711
[58] Field of Search ................... 340/365 R, 711, 712; 400/109, 110, 111, 484

[56] References Cited

U.S. PATENT DOCUMENTS

| | | | |
|---|---|---|---|
| 4,270,022 | 5/1981 | Loh | 340/365 R |
| 4,327,421 | 4/1982 | Wang | 400/484 |
| 4,375,922 | 3/1983 | Maegawa et al. | 400/110 |
| 4,379,288 | 4/1983 | Leung et al. | 340/365 R |
| 4,505,602 | 3/1985 | Wong | 400/110 |
| 4,531,119 | 7/1985 | Nakayama et al. | 340/711 |
| 4,559,615 | 12/1985 | Goo et al. | 400/110 |
| 4,602,878 | 7/1986 | Merner et al. | 400/484 |
| 4,679,951 | 7/1987 | King et al. | 340/712 |
| 4,684,926 | 8/1987 | Yong-Min | 340/365 R |
| 4,692,865 | 9/1987 | Hsu | 340/711 |

FOREIGN PATENT DOCUMENTS 2030335 6/1979 United Kingdom .
2057973 9/1979 United Kingdom .

Primary Examiner—Gerald Brigance
Assistant Examiner—Richard Hjerpe
Attorney, Agent, or Firm—Armstrong, Nikaido, Marmelstein, Kubovcik & Murray

[57] ABSTRACT

This invention is for encoding a language according to the pattern of the language's characters. The invention includes an accompanying keyboard which can be used to encode the language. In particular, the invention is directed toward encoding a language into a six-digit code. The invention is particularly useful with Chinese and Japanese characters. The characters are divided into two parts and given a code according to their respective patterns. The code is then combined into the six-digit code. In addition, a portable multi-language computer and mini-keyboard is provided for encoding the characters.

5 Claims, 26 Drawing Sheets

| CIPHER | NAME | MAIN PATTERN | SUBORDINATE PATTERN |
|---|---|---|---|
| 9 | (CHINESE MEANING) SMALL | 小 | 小 ⺌ ⺍ 个 忄 |
| 8 | (CHINESE MEANING) EIGHT | 八 | 人 ヘ ⺅ ⺈ ⺀ ハ 入 ㇉ |
| 7 | CORNER | ⌐ ⌊ ⌝ ⌟ | ⌐ ⌈ ⌜ ∟ ⌞ ⌟ |
| 6 | SQUARE | ◻ ☐ | ◻ ☐ ▱ |
| 5 | THRUST | 丰 | 扌 戈 丰 丰 丯 ≛ 丰 |
| 4 | CROSS | ＋ Ｘ | ナ ㇏ 七 ˣ 乂 十 |
| 3 | DOT OR RIGHT SLIDE | ˋ ＼ | ノ ⌒ |
| 2 | VERTICAL OR LEFT SLIDE | ｜ Ｊ | ｜ ↓ ／ |
| 1 | HORIZONTAL | — (−) | ／ ∟ ∨ |
| 0 | HEAD = A DOT + A HORIZONTAL STROKE | ⊥ (⊥) | EITHER OF THE UNOCCUPIED LOWER CORNERS |

FIG. 1

EXAMPLES

| CODE | MAIN PATTERN | | | | | | |
|---|---|---|---|---|---|---|---|
| 9 | 小 | 尖 | 当 | 兴 | 木 | 快 | |
| 8 | 八 | 分 | 余 | 铜 | 气 | 羊 | 汆 趣 |
| 7 | ⌐⌐¬」 | 凹 | 写 | 氏 | 却 | 雪 | |
| 6 | 口囗 | 国 | 另 | 咬 | 罪 | 相 | 由 |
| 5 | 半丰 | 青 | 持 | 或 | 丰 | 晖 | 事 |
| 4 | 十 乂 | 古 | 狗 | 左 | 爻 | 代 | 孙 刹 |
| 3 | 丶 | 宝 | 兆 | 造 | 瓜 | | |
| 2 | 丨 丿 | 山 | 顺 | 匕 | 则 | 养 | |
| 1 | 一 | 天 | 地 | 沉 | 气 | 住 | |
| 0 | 亠 | 主 | 户 | 气 | 認 | 病 | |

FIG. 3

BUSHOU TABLE

| FIRST TWO-DIGIT CODE | BUSHOU (NOT AS A CHARACTER) | WHEREFROM | FIRST TWO-DIGIT CODE | BUSHOU (NOT AS A CHARACTER) | WHEREFROM |
|---|---|---|---|---|---|
| 0 | | 亠 | 06 | 言 | 言 |
| 00 | 一* | 亠 | 07 | 亡 | 亡 |
| 01 | 广* | 广 | 07 | 衣,衤 | 衣,衤 |
| 01 | 鹿 | 麓 | 08 | 六,⼧ | 六,⼧ |
| 01 | 立 | 立 | 09 | 麻 | 麻 |
| 02 | 广 | 广 | 1 | | 一 |
| 02 | 方 | 方 | 10 | 一 | 一 |
| 03 | 亦 | 亦 | 10 | 弓 | 弓 |
| 04 | 文,乂' | 文,乂 | 10 | 雨 | 雨 |
| 04 | 辛 | 辛 | 11 | 二* | 二 |
| 05 | (空白 blank) | | 11 | 瓦 | 瓦 |

FIG. 4(A)

| FIRST TWO-DIGIT CODE | BUSHOU (NOT AS A CHARACTER) | WHEREFROM |
|---|---|---|
| 12 | 工 | 工 (+1) |
| 12 | 歹 | 歹 |
| 12 | 羽, 羽' | 羽, 羽 |
| 13 | 王 | 王 (+2) |
| 14 | 耳, 耳' | 耳, 耳 |
| 14 | 子, 孑' | 子, 孑 |
| 15 | (空白 blank) | |
| 16 | 石 | 石 |
| 16 | 西, 襾' | 西 |
| 17 | 酉 | 酉 (+1) |
| 17 | 刀 | 刀 |
| 18 | 頁, 页' | 頁, 页 |

| FIRST TWO-DIGIT CODE | BUSHOU (NOT AS A CHARACTER) | WHEREFROM |
|---|---|---|
| 19 | 示 | 示 |

2 丿丨

| | | |
|---|---|---|
| 20 | 刂*' | 刂 |
| 20 | 片 | 片 |
| 20 | 隹 | 隹 |
| 21 | 乚* | 乚 |
| 21 | 纟*' | 纟 |
| 21 | 鸟', 鸟' | 鸟 |
| 21 | 鱼', 鱼' | 鱼 |
| 22 | 亻*' | 亻 |
| 22 | 月* | 亻月 |
| 22 | 虍* | 虍 |
| 22 | | 豸 |

FIG. 4(B)

| FIRST TWO-DIGIT CODE | BUSHOU (NOT AS A CHARACTER) | WHEREFROM | | FIRST TWO-DIGIT CODE | BUSHOU (NOT AS A CHARACTER) | WHEREFROM |
|---|---|---|---|---|---|---|
| 23 | 亻* | 亻 (+1) | | 27 | 勹* | 勹 |
| 23 | 厶 | 厶 | | 27 | 夕 | 夕 |
| 23 | 鳥,鸟 | 鳥 | | 27 | 卩*¹ | 卩 |
| 23 | 魚,鱼 | 魚 | | 27 | 毛 | 毛 |
|   |   |   | | 27 | 角 | 角 |
| 24 | 彳 | 彳 (+2) | |   |   |   |
| 24 | 舟 | 舟 | | 28 | 齿,齒¹ | 齒,齿 |
| 24 | 身 | 身 | | 28 | 欠 | 欠 |
|   |   |   | |   |   |   |
| 25 | 手 | 手 | | 29 | 禾,禾¹ | 禾,禾 |
| 25 | 牛,牜¹ | 牛,牜 | | 29 | 糸* | 糸 |
| 25 | 鬼 | 鬼 | | 29 | 爪,爫¹ | 爪,爫 |
|   |   |   | |   |   |   |
| 26 | 白,白 | 白 | | 3 |   | 、 |
| 26 | 舌 | 舌 | |   |   |   |
|   |   |   | | 30 | 宀* | 宀 |
| 27 | 山,山 | 山 | | 30 | 氵* | 氵 |
| 27 | 爿ø | 爿 | | 31 | 氵*¹ | 氵 |

ø NOTE THAT IN THIS BUSHOU THE NUMBERING IS FROM RIGHT TO LEFT.

FIG. 4(C)

| FIRST TWO-DIGIT CODE | BUSHOU (NOT AS A CHARACTER) | WHEREFROM | FIRST TWO-DIGIT CODE | BUSHOU (NOT AS A CHARACTER) | WHEREFROM |
|---|---|---|---|---|---|
| 32 | 礻* | 礻 | 4 | ㄨ | 十 |
| 32 | 户 | 户 | 40 | ㄨ | ㄨ |
| 33 | 辶*,辶' | 辶,辶 | 40 | 十 | 十 |
| 33 | 心 | 心 | 41 | 土,圡' | 土,圡 |
| 33 | 灬*' | 灬 | 41 | 士 | 士 |
| 34 | 寸ᵠ | 寸 | 42 | 力 | 力 |
| 35 | 戈ᵠ | 戈 | 42 | 巾,巾 | 巾 |
| | | | 42 | 犭* | 犭 |
| 36 | (空白 blank) | | 43 | (空白 blank) | |
| 37 | 讠*' | 讠 | 44 | 女,女' | 女,女 |
| 37 | 门' | 门 | 44 | 艹*,艹',艹¹,艹,艹 | 艹 |
| 37 | 宀* | 宀 | | | |
| 38 | 穴 | 穴 | 45 | 革 | 革 |
| 39 | 衤*' | 衤 | 45 | 车',车' | 车,车 |

ᵠ NOTE THAT IN THIS BUSHOU THE NUMBERING IS FROM BOTTOM TO TOP
ᵠ NOTE THAT IN THIS BUSHOU THE NUMBERING IS FROM RIGHT TO LEFT.

FIG. 4(D)

| FIRST TWO-DIGIT CODE | BUSHOU (NOT AS A CHARACTER) | WHEREFROM |
|---|---|---|
| 46 | (空白 blank) | |
| 47 | 艹·㇐ | 艹 |
| 48 | 大 | 大 |
| 48 | 走 | 走 |
| 49 | 木, 朩·㇐ | 木, 朩 |
| 5 | 丰 | 丰 |
| 50 | 扌·㇐ | 扌 |
| 50 | 车 | 車 |
| 51 | 虫 | 虫 |
| 51 | 主* | 主 |
| 52 | (空白 blank) | |

| FIRST TWO-DIGIT CODE | BUSHOU (NOT AS A CHARACTER) | WHEREFROM |
|---|---|---|
| 53 | Japanese Kanji 日文汉字 | |
| 54 | Rare characters 罕见字 | |
| 55 | Bushou 部首 | |
| 56 | ⌀ Unclassified Regular Script 不能区别部首之繁体字 | |
| 57 | ⌀ Unclassified Simplified Form 不能区别部首之简体字 | |
| 58 | 夹* | 夹 |
| 59 | 耒, 耂·㇐ | 耒, 耂 |
| 6 | 口 | □ |
| 60 | 口 | 口 |
| 61 | 日 | 日 (+1) |

⌀ BOTH INCLUDE A FEW CHARACTERS WHICH CLEARLY POSSESS A BUSHOU BUT ARE SQUEEZED OUT FROM THE CONGESTED AREAS.

FIG. 4(E)

| FIRST TWO-DIGIT CODE | BUSHOU (NOT AS A CHARACTER) | WHEREFROM |
|---|---|---|
| 61 | 𧾷*† | 足 |
| 61 | 見 | 見 |
| 62 | 目 | 目 (+2) |
| 62 | ⸺* | 皿 (+2) |
| 63 | 黑 | 黑 |
| 64 | 田 | 田 |
| 65 | (空白 blank) | |
| 66 | 口* | 口 |
| 67 | 日 | 日 (+1) |
| 68 | 貝 | 貝 |
| 68 | 足 | 足 |
| 69 | (空白 blank) | |

| FIRST TWO-DIGIT CODE | BUSHOU (NOT AS A CHARACTER) | WHEREFROM |
|---|---|---|
| 7 | ㄱ ㄱ ㄴ ㄴ | |
| 70 | (空白 blank) | |
| 71 | 厂 | 厂 |
| 71 | 皿 | 皿 |
| 71 | 马†, 马ʹ | 马 |
| 71 | 见†, 见 | 见 |
| 72 | 尸 | 尸 |
| 72 | 卩* | 卩 |
| 72 | 户† | 户 |
| 72 | 月 | 月 |
| 73 | 阝* | 阝 (+1) |
| 73 | 馬, 馬 | 馬 |
| 73 | 髟* | 髟 |
| 74 | 又, 又† | 又, 又 |
| 74 | 殳 | 殳 |

FIG. 4(F)

| FIRST TWO-DIGIT CODE | BUSHOU (NOT AS A CHARACTER) | WHEREFROM | FIRST TWO-DIGIT CODE | BUSHOU (NOT AS A CHARACTER) | WHEREFROM |
|---|---|---|---|---|---|
| 75 | 戊 | 戊 | 80 | 人, 人' | 人, 入 |
|  |  |  | 80 | 宀* | 宀 |
| 76 | (空白 blank) |  |  |  |  |
|  |  |  | 81 | 气 | 气 |
| 77 | 門 | 門 | 81 | 金 | 金 |
| 77 | 骨, 骨 | 骨 |  |  |  |
| 77 | 臼, 臼' | 臼, 臼 | 82 | ˋ* | ˋ (+2) |
| 77 | 鼠 | 鼠 |  |  |  |
| 77 | 冂, 冂' | 冂, 几 | 83 | (空白 blank) |  |
| 77 | 几* | 几 |  |  |  |
|  |  |  | 84 | 父 | 父 |
| 78 | 風, 风' | 風, 风 (+1) | 84 | 夂* | 夂 |
| 78 | 鬥 | 鬥 (+1) |  |  |  |
| 78 | 贝', 贝 | 贝 | 85 | 羊, 羊' 羊' | 羊, 羊, 羊 |
| 79 | 匚* | 匚 (+2) | 86 | (空白 blank) |  |
|  |  |  | 87 | 钅*' | 金 |

8 八

| 80 | 八, 八' | 八, 八 |
|---|---|---|

FIG. 4(G)

| FIRST TWO-DIGIT CODE | BUSHOU (NOT AS A CHARACTER) | WHEREFROM | FIRST TWO-DIGIT CODE | BUSHOU (NOT AS A CHARACTER) | WHEREFROM |
|---|---|---|---|---|---|
| 87 | 缶, 缶 | 缶 | 92 | (空白 blank) | |
| 87 | 食, 食† | 食, 食 | 93 | (空白 blank) | |
| 88 | 矢 | 矢 | 94 | (空白 blank) | |
| 88 | ⺮* | 竹 | | | |
| 89 | (空白 blank) | | 95 | 䒑* | 䒑 |
| 9 | | 小 | 96 | 尚, 㡀† | 尚, 㡀 |
| 90 | 小, ⺌†, ⺍† | 小, ⺌, ⺍ | 97 | ⺍* | ⺍ |
| 90 | 忄*† | 忄 | | | |
| 90 | 水, 氺† | 水, 氺 | 98 | 火, 灬† | 火, 灬 |
| 91 | (空白 blank) | | 99 | 米, ⺼† | 米, ⺼ |

NOTE: 1) BUSHOUS MARKED WITH * ARE NON-CHARACTERS.
2) BUSHOUS MARKED WITH † HAVE IN THEIR RESPECTIVE SIMPLIFIED OR ABERRANT FORMS THE SAME TWO-DIGIT CODE.
3) BUSHOUS MARKED WITH ‡ ARE SIMPLIFIED OR ABERRANT FORM OF OTHER CHARACTER BUSHOUS OR NON-CHARACTER BUSHOUS ALSO IN THE LIST.

FIG. 4(H)

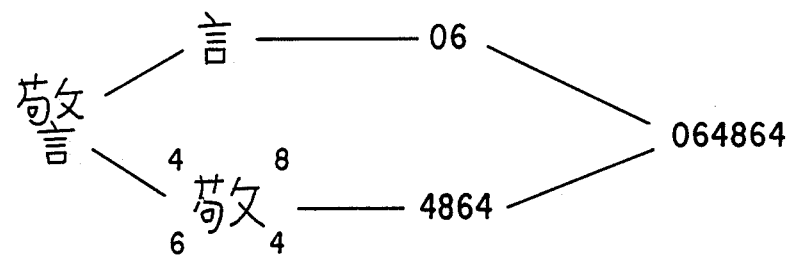
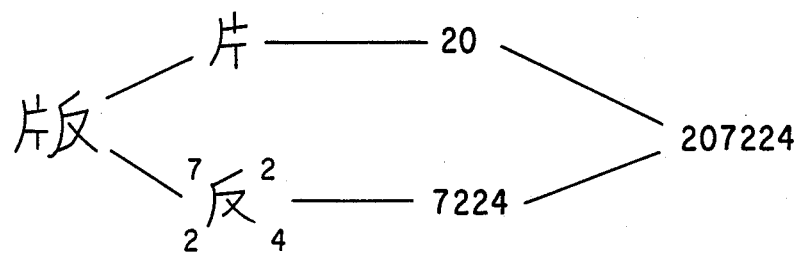
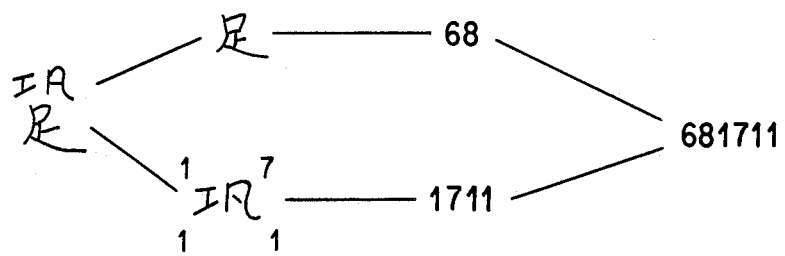
FIG. 5C

JAPANESE KATAKANA

| Code | Char | Code | Char | Code | Char | Code | Char |
|---|---|---|---|---|---|---|---|
| 650001 | ア | 650022 | シ | 650042 | ニ | 650062 | ミ |
|  |  | 650122 | ジ |  |  |  |  |
| 650002 | イ |  |  | 650043 | ヌ | 650063 | ム |
|  |  | 650023 | ス |  |  |  |  |
| 650003 | ウ | 650123 | ズ | 650044 | ネ | 650064 | メ |
|  |  |  |  | 650045 | ノ | 650065 | モ |
| 650004 | エ | 650024 | セ |  |  |  |  |
|  |  | 650124 | ゼ | 650051 | ハ | 650071 | ヤ |
|  |  |  |  | 650151 | バ |  |  |
| 650005 | オ | 650025 | ソ | 650251 | パ | 650073 | ユ |
|  |  | 650125 | ゾ |  |  |  |  |
| 650011 | カ |  |  |  |  | 650075 | ヨ |
| 650111 | ガ |  |  | 650052 | ヒ |  |  |
|  |  | 650031 | タ | 650152 | ビ | 650081 | ラ |
|  |  | 650131 | ダ | 650252 | ピ |  |  |
| 650012 | キ |  |  |  |  | 650082 | リ |
| 650112 | ギ | 650032 | チ | 650053 | フ |  |  |
|  |  | 650132 | ヂ | 650153 | ブ | 650083 | ル |
| 650013 | ク |  |  | 650253 | プ |  |  |
| 650113 | グ | 650033 | ツ |  |  | 650084 | レ |
|  |  | 650133 | ヅ | 650054 | ヘ |  |  |
| 650014 | ケ |  |  | 650154 | ベ | 650085 | ロ |
| 650114 | ゲ | 650034 | テ | 650254 | ペ |  |  |
|  |  | 650134 | デ |  |  | 650091 | ワ |
| 650015 | コ |  |  | 650055 | ホ | 650095 | ヲ |
| 650115 | ゴ | 650035 | ト | 650155 | ボ |  |  |
|  |  | 650135 | ド | 650255 | ポ | 659999 | ン |
| 650021 | サ |  |  |  |  |  |  |
| 650121 | ザ | 650041 | ナ | 650061 | マ | 651000 | ー |

FIG. 8(A)

JAPANESE HIRAGANA
(69 INDICATES HIRAGANA AND THE REST IS SAME AS KATAKANA WHOSE INDICATOR IS '65')

| | | | |
|---|---|---|---|
| 690001 あ | 690022 し / 690122 じ | 690042 に | 690062 み |
| 690002 い | 690023 す / 690123 ず | 690043 ぬ | 690063 む |
| 690003 う | | 690044 ね | 690064 め |
| 690004 え | 690024 せ / 690124 ぜ | 690045 の | 690065 も |
| 690005 お | 690025 そ / 690125 ぞ | 690051 は / 690151 ば / 690251 ぱ | 690071 や |
| 690011 か / 690111 が | 690031 た / 690131 だ | 690052 ひ / 690152 び / 690252 ぴ | 690073 ゆ |
| 690012 き / 690112 ぎ | 690032 ち / 690132 ぢ | 690053 ふ / 690153 ぶ / 690253 ぷ | 690075 よ |
| 690013 く / 690113 ぐ | 690033 つ / 690133 づ | 690054 へ / 690154 べ / 690254 ぺ | 690081 ら |
| 690014 け / 690114 げ | 690034 て / 690134 で | 690055 ほ / 690155 ぼ / 690255 ぽ | 690082 り |
| 690015 こ / 690115 ご | 690035 と / 690135 ど | 690061 ま | 690083 る |
| 690021 さ / 690121 ざ | 690041 な | | 690084 れ |
| | | | 690085 ろ |
| | | | 690091 わ |
| | | | 690097 を |
| | | | 699999 ん |

FIG. 8(B)

CODES FOR   155000-155099
PUNCTUATION MARKS  155900-155999

| | | | | | |
|---|---|---|---|---|---|
| , | COMMA | 155000 | ( | PARENTHESIS (OPENING) | 155061 |
| . | FULL STOP | 155001 | ) | PARENTHESIS (CLOSING) | 155069 |
| 。 | CHINESE FULL STOP | 155008 | | | |
| ! | EXCLAMATION MARK | 155009 | [ | SQUARE BRACKET (OPENING) | 155071 |
| ? | QUESTION MARK | 155010 | ] | SQUARE BRACKET (CLOSING) | 155079 |
| : | COLON | 155011 | | | |
| ; | SEMICOLON | 155019 | 《 | BOOK NAME QUOTE (OPENING) | 155081 |
| | | | 》 | BOOK NAME QUOTE (CLOSING) | 155089 |
| ' | SINGLE QUOTATION MARK (OPENING) | 155021 | | | |
| ' | SINGLE QUOTATION MARK (CLOSING) | 155029 | - | HYPHEN | 155091 |
| | | | — | DASH | 155092 |
| " | DOUBLE QUOTATION MARK (OPENING) | 155031 | / | SLANT | 155095 |
| " | DOUBLE QUOTATION MARK (CLOSING) | 155039 | | | |
| | | | † | DAGGER | 155098 |
| 「 | SINGLE CHINESE QUOTATION MARK (OPENING) | 155041 | * | ASTERISK | 155099 |
| 」 | SINGLE CHINESE QUOTATION MARK (CLOSING) | 155049 | ○ | CIRCLE | 155900 |
| 、 | ENUMERATIONS DIVIDER | 155045 | • | DOT | 155990 |
| 『 | DOUBLE CHINESE QUOTATION MARK (OPENING) | 155051 | | | |
| 』 | DOUBLE CHINESE QUOTATION MARK (CLOSING) | 155059 | | | |

FIG. 9

−HOW TO TAKE CODE FOR
THE NUMERICAL SYMBOLS

150000 − 150109
151111 − 151234
159001 − 159401

| | | | |
|---|---|---|---|
| 0 | 150000 | 1/2 | 150050 |
| 1 | 150001 | 1/4 | 150025 |
| 2 | 150002 | 3/4 | 150075 |
| 3 | 150003 | | |
| 4 | 150004 | { | 150081 |
| 5 | 150005 | } | 150091 |
| 6 | 150006 | % | 150100 |
| 7 | 150007 | | |
| 8 | 150008 | @ | 150101 |
| 9 | 150009 | & | 150109 |
| | | √ | 150144 |
| + | 150071 | # | 151234 |
| − | 150041 | | |
| × | 150015 | ∵ | 151111 |
| ÷ | 150045 | ∴ | 152222 |
| < | 150049 | , | 159009 |
| > | 150051 | , | 159027 |
| ≠ | 150089 | ' | 159001 |
| = | 150099 | " | 159010 |
| ~ | 150199 | ° | 159100 |
| → | 150201 | ¥ | 159200 |
| ← | 150209 | £ | 159300 |
| ↓ | 150301 | $ | 159400 |
| ↑ | 150309 | ¢ | 159401 |

FIG. 10

LIST OF BUSHOUS ABOLISHED (110)
THE FOLLOWING STROKE/PATTERNS ARE TREATED AS BUSHOUS IN XIANDAI
HANYU CIDIAN, BUT ARE NOT COUNTED AS BUSHOUS IN THIS SYSTEM.

| | | | | |
|---|---|---|---|---|
| 丨 | 彐 | 尺 | 光 | 卯 |
| 丿 | 互 | 玉 | 肉 | 疣 |
| 丶 | 巳 | 甘 | 自 | 車 |
| 一 | 己 | 龙 | 色 | 非 |
| 乙 | 屮 | 龍 | 齐 | 黾 |
| 卜 | 丷 | 业 | 齊 | 黽 |
| 厂 | 幺 | 申 | 艮 | 隶 |
| 匕 | 巛 | 由 | 辰 | 韭 |
| 儿 | 天 | 瓜 | 麦 | 是 |
| 几 | 韦 | 玄 | 麥 | 香 |
| 勹 | 韋 | 民 | 赤 | 音 |
| 亠 | 屮 | 疋 | 束 | 首 |
| 又 | 廿 | 皮 | 豆 | 禺 |
| 干 | 卄 | 癶 | 豕 | 高 |
| 兀 | 支 | 矛 | 镸 | 髟 |
| 尢 | 比 | 戋 | 卤 | 黄 |
| 弋 | 无 | 亚 | 鹵 | 黹 |
| 彡 | 牙 | 亞 | 里 | 鼎 |
| 夂 | 支 | 臣 | 谷 | 黍 |
| 丸 | 氏 | 束 | 釆 | 鼓 |
| 丬 | 斗 | 而 | 龟 | 鼻 |
| ヨ | 聿 | 至 | 龜 | 龠 |

AMONG THEM, TWELVE ARE REALLY NEW MODERN BUSHOUS CREATED FOR THE
SIMPLIFIED FROM OF CHINESE CHARACTERS. ELIMINATION IS DONE CHIEFLY
BY DOING AWAY WITH BUSHOUS THAT CONTROL LESS THAN SIX CHARACTERS.

FIG. 11

—HOW TO CODE EUROPEAN ALPHABETS (ADOPTING FOUR-CORNERS INDEXING METHOD FOR THIS USE UNDER FIRST TWO DIGIT INDICATOR '05)

1. PINNACLE OF A TRIANGULAR PATTERN = 3

2. ROUND CORNERS = 8

3. INCOMPLETE ROUND CORNER = 6

4. VOID CORNER = 0

5. PART OF THE CAPITAL LETTERS OF THE ENGLISH LANGUAGE = SMALL LETTERS +1 (IN ENGLISH ARE ZWOCSXV)

6. ENGLISH CAPITAL LETTERS USED AS SMALL LETTERS IN RUSSIAN = ENGLISH CAPITAL LETTERS −1 (IN RUSSIAN ARE BHKMT)

7. ENGLISH SMALL LETTERS USED AS RUSSIAN CAPITAL LETTER = ENGLISH SMALL LETTER +1 (IN RUSSIAN y)

8. ENGLISH SMALL LETTERS WITH ADDITIONAL SIGNS IN GERMAN = ENGLISH SMALL LETTERS +1 (ä,ü)(ö+2)

9. ENGLISH CAPITAL LETTERS WITH ADDITIONAL SIGNS IN GERMAN = ENGLISH CAPITAL LETTERS +1 (Ä,Ü)(Ö +3)

10. ENGLISH SMALL LETTERS WITH ADDITIONAL SIGNS IN FRENCH = ENGLISH SMALL LETTERS +10 (ç é ê è ë)

11. ENGLISH SMALL LETTERS WITH ADDITIONAL SIGNS IN SPANISH = ENGLISH SMALL LETTERS +2 (ñ)

FIG. 12(A)

-HOW TO CODE EUROPEAN LANGUAGE LETTERS

| ENGLISH | | | | | | | |
|---|---|---|---|---|---|---|---|
| | | s | 058118 | L | 052071 | è | 058897(+11) |
| | | t | 054061 | M | 053322 | ê | 058898(+12) |
| a | 051881 | u | 052280 | N | 053223 | ë | 058899(+13) |
| b | 052008 | v | 053230 | O | 058001(+1) | | |
| c | 058686 | w | 053233 | P | 057821(+1) | | |
| d | 050280 | x | 054000 | Q | 058003 | GERMAN | |
| e | 058886 | y | 053200 | R | 057823 | ä | 051882(+1) |
| f | 056140 | z | 051771 | S | 058119(+1) | ö | 058002(+2) |
| g | 058181(+1) | | | T | 051020 | ü | 052281(+1) |
| h | 052002 | A | 053023 | U | 052288 | | |
| i | 053020 | B | 057878 | V | 053231(+1) | Ä | 053024(+1) |
| j | 053060 | C | 058687(+1) | W | 053234(+1) | Ö | 058004(+3) |
| k | 052003 | D | 057870 | X | 054001(+1) | Ü | 052289(+1) |
| l | 052000 | E | 057171 | Y | 053220 | | |
| m | 052603(+1) | F | 057120 | Z | 051772(+1) | | |
| n | 052602 | G | 058688 | | | SPANISH | |
| o | 058000 | H | 052200 | | | ñ | 052604(+2) |
| p | 057820 | I | 052000 | FRENCH | | | |
| q | 058702 | J | 050206 | ç | 058696(+10) | | |
| r | 052600 | K | 052203 | é | 058896(+10) | | |

FIG. 12(B)

-HOW TO CODE RUSSIAN LETTERS

| а 056886 | р 057820 | А 053023 | Р 057821(+1) |
|---|---|---|---|
| б 056280 | с 058686 | Б 057178 | С 058687(+1) |
| в 057877(-1) | т 051019(-1) | В 057878 | Т 051020 |
| г 057620 | у 053200 | Г 057621(+1) | У 053201(+1) |
| д 057773 | ф 055000 | Д 057774(+1) | Ф 055001(+1) |
| е 058886 | х 054000 | Е 057171 | Х 054001(+1) |
| ж 053224(+1) | ц 052273 | Ж 053225(+2) | Ц 052274(+1) |
| з 056868 | ч 052205(+5) | З 056869(+1) | Ч 052206(+6) |
| и 052332 | ш 052277 | И 052333(+1) | Ш 052278(+1) |
| й 056032 | щ 052275(+2) | Й 052334(+2) | Щ 052276(+3) |
| к 052202(-1) | ы 052270 | К 052203 | Ы 052271(+1) |
| л 057724(+2) | ь 052078 | Л 057725(+3) | Ь 052079(+1) |
| м 053321(-1) | э 056860 | М 053322 | Э 056861(+1) |
| н 052199(-1) | ю 052801(+1) | Н 052200 | Ю 052802(+2) |
| о 058000 | я 058722 | О 058001(+1) | Я 058723(+1) |
| п 057722 | | П 057723(+1) | |

FIG. 13

– HOW TO CODE GREEK LETTERS

| | | | | | | | |
|---|---|---|---|---|---|---|---|
| α | 058281 | ρ | 058020 | A | 053023 | P | 057821(+1) |
| β | 058828 | σ | 056180 | B | 057878 | Σ | 057777 |
| γ | 056200 | ς | 058668 | Γ | 057621(+1) | T | 051020 |
| δ | 056080 | τ | 057720 | Δ | 053033 | Υ | 056620 |
| ε | 056161 | υ | 052260 | E | 057171 | Φ | 055001(+1) |
| ζ | 056168 | φ | 055000 | Z | 051772(+1) | X | 054001(+1) |
| η | 056802 | χ | 054000 | H | 052200 | Ψ | 059041(+1) |
| θ | 058080 | ψ | 059040 | Θ | 058081(+1) | Ω | 056611 |
| ι | 052060 | ω | 056688 | I | 052000 | | |
| κ | 052204(+1) | | | K | 052203 | | |
| λ | 053021(+1) | | | Λ | 053025(+2) | | |
| μ | 052201 | | | M | 053322 | | |
| ν | 052230 | | | N | 053223 | | |
| ξ | 052162 | | | Ξ | 051010 | | |
| ο | 058000 | | | O | 058001(+1) | | |
| π | 051022 | | | Π | 057723(+1) | | |

FIG. 14

SYSTEM OF ENCODING CHINESE CHARACTERS ACCORDING TO THEIR PATTERNS AND ACCOMPANYING KEYBOARD FOR ELECTRONIC COMPUTER

This is a Continuation-in-Part of Ser. No. 831,763, filed Feb. 21, 1986, now abandoned.

BACKGROUND OF THE INVENTION

1. Field of Invention

This invention relates to a system of coding words from different languages, and especially for coding Chinese characters. The system of coding can be used in a small computer with a keyboard.

2. Description of the Prior Art

Typewriters currently in use include manual mechanical typewriters and computer typewriters.

Manual mechanical typewriters, such as Chinese typewriters, can only type one type of character. Chinese character trays are adopted in a Chinese typewriter, with only one character typed for each stroke. The operator needs to understand and to be familiar with Chinese characters in order to operate the typewriter. The efficiency of this kind of typewriter is low and it is not easy to correct the typed characters. Although there is a gradual increase in the use of computer typewriters, they are limited to typing one language because of the difficulty of inputting different languages that do not use alpha-numerical characters.

The problem of low efficiency exists in Chinese typewriting and telecommunication at present. Computer Chinese typewriters adopt three different inputting modes. These are: (1) Pinyin entry mode, (2) the strokes of the character entry method and (3) using a four-digit code for each of the four corners of the character (four corner indexing method).

The Pinyin entry mode is used at present. The operator inputs the character according to the alphabet of Chinese Pinyin. However, due to the vast territory of China, there are many dialects and so the same Chinese character will have any different pronunciations.

For example:

| Chinese Character | Pinyin | |
|---|---|---|
| | Standard Putonghua Pinyin (Mandarin) | Cantonse Pinyin |
| 无 | wu | meu |
| 一 | yi | yed |
| 弟 | di | tei |
| 中 | zhong | zong |
| 北 | bei | beg |
| 师 | shi | xi |

From the above examples, it can be seen that the pronunciation may be very different for the same character. Therefore, it is impossible for people who don't speak Putonghua to use this inputting mode. There is an additional problem for Putonghua-speaking people using this mode. That is, there are many homonyms with the same Pinyin and the character must be chosen from the number of different homonyms.

For example, in Chinese Pinyin, "fang" and "dong" represent different words.

"fang" represents 方 . 仿 . 芳 . 坊 . 访 . 防 . 房 . 纺 . 舫 . 彷 . 肪 . 枋 . 放 . .

(altogether 14 words)

"dong" represents 东 . 冬 . 咚 . 氡 . 董 . 懂 . 动 . 冻 . 侗 . 洞 . 垌 . 峒 . 揀 . 胨 .

(altogether 14 words)

The small number of Pinyin's which represent only one character each are:

| dei 得 | den 扽 | fo 佛 | gei 给 | hng 哼 |
| kei 剋 | lo 咯 | me 么 | neng 能 | nin 您 |
| nou 耨 | nuan 暖 | ri 日 | sen 森 | seng 僧 |
| shei 谁 | tei 忒 | zhei 这 | (altogether 18 words) | |

Among the ten thousands of Chinese Characters, a major portion of them have homonyms, the number of which varies from several to tens. Therefore the Chinese computer operator must select the character from the number of different homonyms. Since one Pinyin does not correspond to only one Chinese character, a problem also occurs in using Pinyin in telecommunication.

Data can also be input in accordance with the strokes of the characters. Chinese is classified by Bushou and words can be looked up according to the number of strokes of the Chinese characters. Certain strokes are assigned digital codes. The order of digits corresponds to the order of strokes. These digital codes are used for input of data into the Chinese computer. However, the order of strokes is not definite and different people may use a different order of strokes.

Take the character " 找 " as an example, either " 一 " or " 丨 " of the left portion can be written first. For the " 口 ", either the " 口 " on the left hand side or the " 丨 " in the middle may be written first. The order of strokes may be different for the same character and the code is therefore different, too. This is a problem of input according to the order of strokes.

The Chinese dictionary also adopts the system of classifying Chinese characters by 4-digit codes, stipulating that certain strokes correspond to certain digital codes. The code can be obtained according to the pattern of the character. The problem is that there are a number of repeated codes.

For example, under the code 4460, there are the characters:

西 . 酉 . 酉 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 . 否 .

consituting altogether 38 characters. Therefore, this system is not suitable for computer input or telecommunication.

Nowadays, Chinese telecommunication uses a 4-digit code representing one character. There is a Chinese code book, but the characters do not correspond with the codes in a logical way and so memorization of the codes is difficult. The Chinese code book is arranged in digital order from 0001 to 9999. The user has to look up the Bushou and the number of strokes before the character can be found.

| Character | Codes |
|---|---|
| 访 | 2101 |
| 昉 | 6419 |
| 彷 | 8217 |
| 纺 | 5902 |
| 访 | 6056 |
| 舫 | 6059 |

| Character | Codes |
|---|---|
| 汽 | 5960 |

This system has been in use for decades. However, apart from the cable office, nobody wants to use this system of coding. An additional problem is the number of characters is also limited (at most 9999 characters).

An additional problem is that there are no portable Chinese typewriters or Chinese computers at present. The conventional type of typewriter or computer is desk-sized, with a very large host or keyboard. Personal computers and standard keyboards are not generally used. These typewriters and computers are to be used in offices and are not portable. Therefore, a portable Chinese typewriter is needed for use in Western Europe or Japan.

OBJECT OF THE INVENTION

The object of the invention is to provide a system of coding languages of different countries and especially those countries that do not use alpha-numeric characters. The system of the present invention assigns digital codes. The present invention is especially useful for encoding Chinese characters since the present invention is not based on the order of strokes. Thus, the system of coding a language is easy to learn and memorize. Another object of this invention is to provide a portable multi-language computer and mini-keyboard.

SUMMARY OF THE INVENTION

This invention relates to an encoding method for Chinese, Japanese, English, French, German, Spanish, Russian, and Greek to be used for computer data input and telecommunication.

This invention is a digital encoding method. The order of digits are arranged according to a rule based on the relationship between (a) Chinese strokes or patterns and (b) digits in order to obtain a code.

The Chinese encoding method of this invention only takes the pattern of the characters into account without considering the order of strokes while marking out some "Bushou's". The character is broken into (a) the Bushou and (b) the portion left behind after elimination of the Bushou. The two portions are each assigned a code and the codes are combined to form the code of that character. This method is logical and easy to learn and memorize. Another important feature of the present invention is that one and only one code corresponds to one Chinese character. Therefore, not only can it be used for computer data input, but also for telecommunication.

The applicant has also invented a mini-word processor, hereinafter called "ANN TSE KAI Character Writer". The machine is small, light weight and is portable. The keyboard is unique, comprising only digital keys and function keys. The keyboard is small enough to be operated by one hand. Since the keyboard is small, each key is multi-functional and there are imagery indications of the functions on the keys. This mini-word processor can be used with the encoding method of the present invention.

In addition to typing the block characters of Chinese and Japanese, the "ANN TSE KAI Character Writer" can also type Japanese Kana, English, French, German, Spanish, Russian and Greek since the above languages can all be digitally encoded using the encoding system of the present invention.

The "ANN TSE KAI Character Writer" mostly employs common components. The linking of the components is specially designed, enabling the machine to have the functions of typing, correcting, deleting and moving words or paragraphs forwards or backwards, that is, typing printing and editing. The information may also be displayed and data may be input into the machine through on-line data storage. Since the "ANN TSE KAI Character Writer" can use an ordinary CRT such as a television, the machine may also be used as an ordinary television set.

DESCRIPTION OF THE DRAWINGS

FIG. 1 illustrates the relationship between different Chinese strokes and its corresponding digital number (digit).

FIG. 3 are examples for a further explanation of FIG. 1 with Chinese characters.

FIGS. 4A–4H illustrates how the present invention's Bushou corresponds with the digits.

FIGS. 5A–5C are some examples of how the present invention's codes are formed for Chinese characters.

FIGS. 8A–8B show Japanese katakana an hiragana characters.

FIG. 9 shows encoded punctuation marks.

FIG. 10 shows how numerals are encoded.

FIG. 11 shows obsolete Bushous.

FIGS. 12A–12B show how to encode the European alphabet.

FIG. 13 shows the encoded Russian alphabet.

FIG. 14 shows the encoded Greek alphabet.

DETAILED DESCRIPTION OF THE PREFERRED EMBODIMENT

Figure 2:
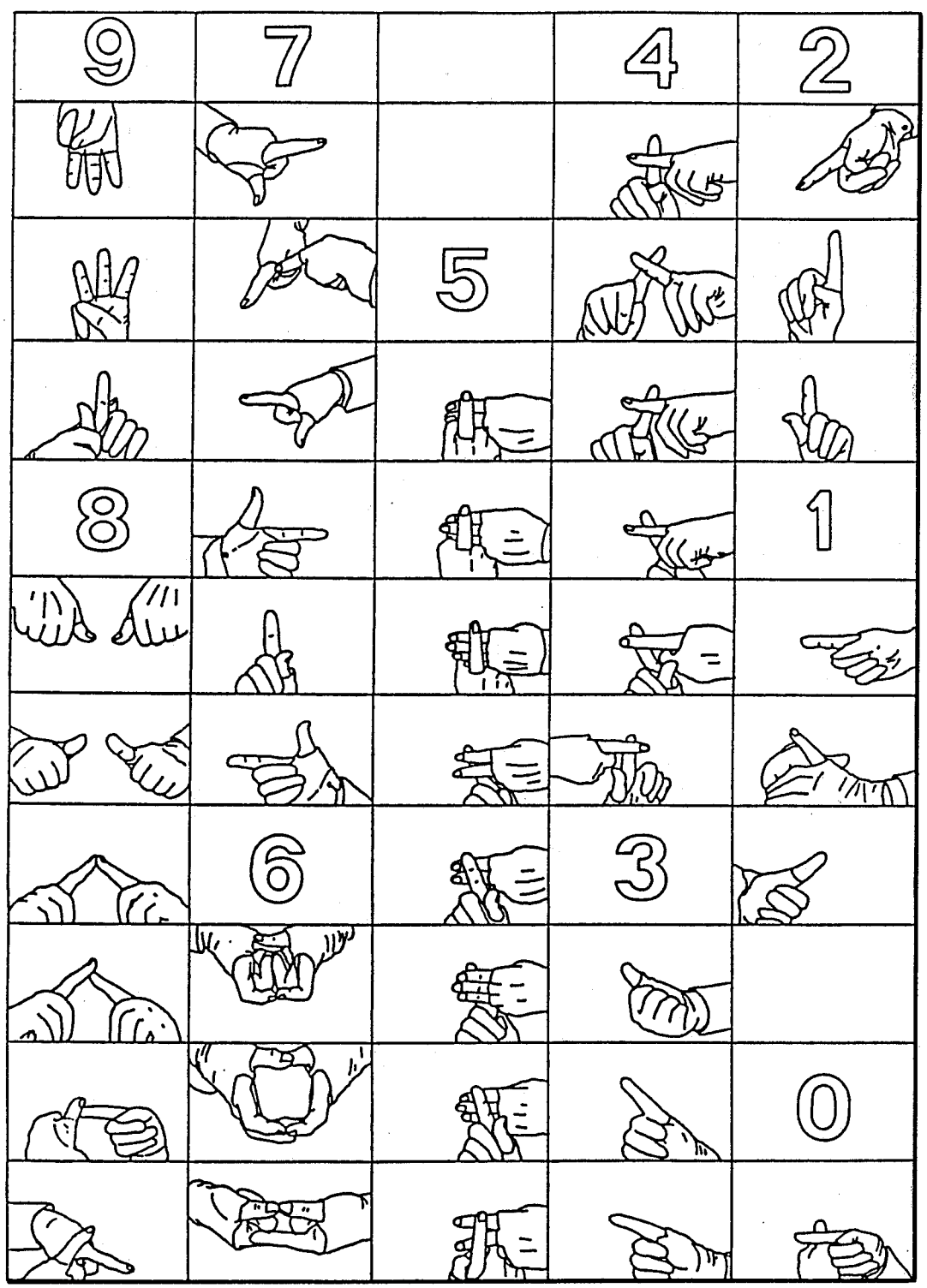
FIG. 2 is an illustration of FIG. 1 which shows how the digital numbers correspond to the different Chinese strokes using hands (thumb and fingers).

First of all, the method of encoding characters will be described followed by a description of the mini-word processor. The method of encoding will be described using Chinese characters as the example.

Chinese characters are formed with strokes and patterns. Although there are many forms of strokes and patterns, the present invention divides them into 10 classes. One form of a pattern is chosen as the main pattern in each class, whereas other patterns will be regarded as subordinate patterns of this pattern.

FIG. 1 shows the corresponding relationship between the patterns and the digits. The digit 9 corresponds to the main pattern " 土 ", which is constituted by 3 strokes and has 5 subordinate patterns. The digit 8 corresponds to the main pattern " ɔ " which has 8 subordinate patterns. The digit 7 corresponds to the main patterns " ⌒⌒ " (i.e., bend), with 6 subordinate patterns. The digit 6 corresponds to the main pattern " o " or "□" (i.e., square), with 3 subordinate patterns. The digit 5 corresponds to " ╪ " (i.e., two o crosses), with 7 subordinate patterns. The digit 4 corresponds to the main pattern "+" or "×" (i.e., one cross), with 6 subordinate patterns. The digit 3 corresponds to the main pattern " ヽ " or " ～ ", with 2 subordinate patterns. The digit 2 corresponds to the main pattern " ｜ " or " ｊ ", with 3 subordinate patterns. The digit 1 corresponds to the main pattern " ~ ", with 3 subordinate patterns. The digit 0 corresponds to the main pattern "  ". Due to the fact that Chinese characters are in block form, no stroke exists in the lower left or right portion for some of the characters. For example, there is no lower left portion for " " and no lower right portion for " ". The digit 0 will be used for representing such absent lower portions.

The characteristic of the above corresponding relationship is that a pattern may be a stroke, may be a number of strokes or no strokes.

FIG. 2 is an imagery indication of the patterns of FIG. 1 showing thumbs and fingers of a hand to show the strokes.

FIG. 3 are examples of Chinese characters with main patterns and subordinate patterns of FIG. 1.

The corresponding relationships of the patterns and digits illustrated in FIG. 1 are very simple. They are easy to be memorized by anyone whether familiar with Chinese or not.

The corresponding relationships of FIG. 1 will be further applied below.

Chinese characters which are in block form comprise strokes patterns. This implies that Chinese characters may be broken up. For example, " " may be broken into " " and " " and " " may be broken into " " and " ".

The method of this invention makes use of the separability of Chinese characters and divides the characters into two portions, the first portion being the "Bushou" and the second portion being the "Remaining part" or "portion left behind". These two portions are assigned a code each and then the two codes are combined to form a code for this character.

According to the method of this invention, the Bushou is assigned a 2-digit code whereas the portion left behind is assigned a 4-digit code. Therefore, the codes of this invention comprise 6 digits.

In this invention, a series of Bushou's are chosen and encoded. FIG. 4 lists out the Boshou's chosen and the codes assigned. The codes are arranged in accordance with the patterns of FIG. 1 and the order of the two codes is decided by the principle of "upper comes before lower and left comes before right". For example, the code of the Bushou " " is 01 because 0 represents " " and 1 represents " " and " " is above " ". Therefore the code of " " is 01. The code " " is 02 because 0 represents " " and 2 represents " " and " " is above " ". Therefore, the code of " " is 02.

The third (and sixth) column of FIG. 4 shows how the code is assigned to each Bushou. The code assignment is shown according to darkened or thickened lines.

When encoding any Chinese character, the Bushou must be found first. The corner pattern of a Chinese character is usually taken as the Bushou. The Bushou must be taken in an anti-clockwise direction starting from the upper portion of the character and going through the left and lower portion to the right portion.

Each Chinese character can only have one Bushou. For example, the Bushou of the character " " is " " and that of the character " " is " ".

The Bushou used must occupy at least two corners of the Chinese character.

For example: the Bushou of the character " " is " "

the Bushou of the character " " is " ".

Since the Bushou should occupy two corners and each corner is represented by a digit, the Bushou is coded by two digits.

When a Bushou occupies two or more corners and only one digit of FIG. 1 will meet the pattern, the digit '0' will be given as the second digit of the Bushou. For example, for the character " ", " " is the Bushou which occupies two corners. According to FIG. 1, " " is represented by the digit 0. Since " " occupies two corners, accordance to the rule mentioned above, the Bushou code of " " is 00 is the present invention's system.

The present invention's system of encoding Bushou is based on the above principle. The corresponding 2-digit codes are derived from the above formula.

In practice, in separating a Chinese character, the Bushou's in the present invention's Bushou List should be used as a demarcation. For example: for the character " ", there is a Bushou " ", code 27, in the present invention's Bushou list. When " " is broken up, it should be separated into " " and " ". For example: for the character " ", there is a Bushou " ", code 34, in the present invention's Bushou List. When " " is broken apart, it should be broken up into " " and " ".

Figure 5A:
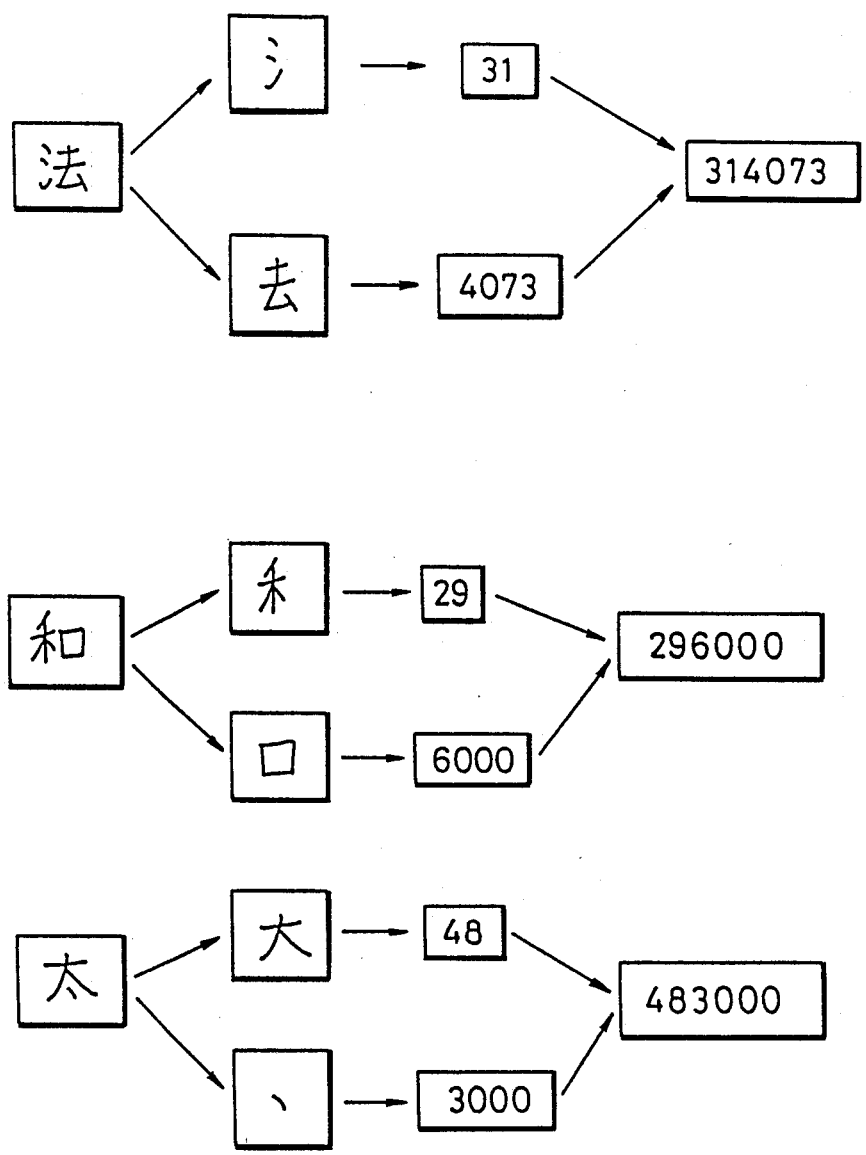

Referring to FIG. 5(A), " " is separated into Bushou " " and remaining part " ". According to the Bushou list, " " is coded 31. In addition, for the remaining part according to FIG. 1, "+" of the remaining part occupies the left upper corner and the right upper corner. Then, the left upper corner should be coded as 4, the right upper corner should be coded as 0, the left lower corner " " should be coded as 7 and the right lower corner " " should be coded as 3. Therefore, " " should be coded as 314073.

Figure 5B:
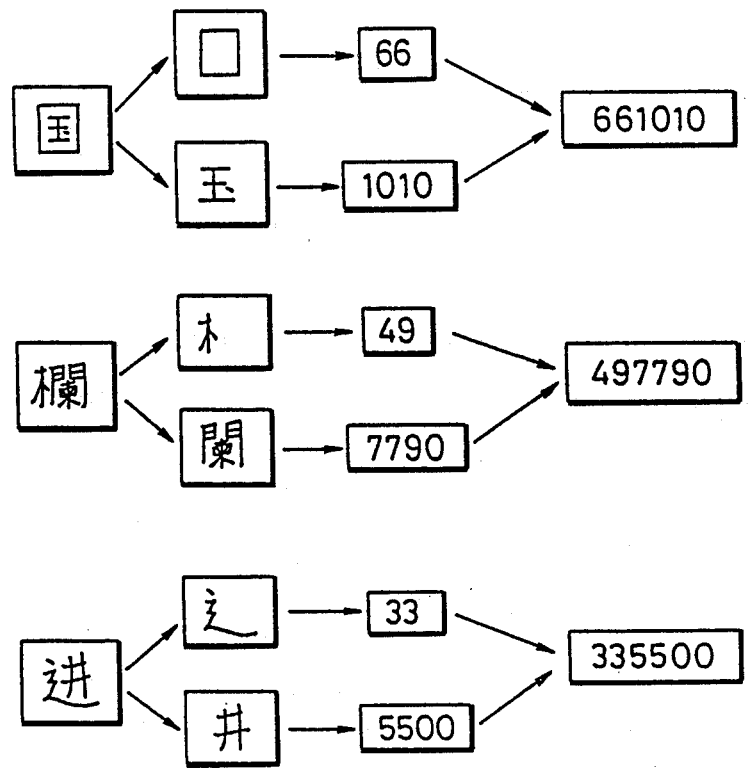

Referring to "FIG. 5(A), " " is separated into Bushou " " and the remaining part " ". According to the Bushou list, " " is coded as 29. The remaining part, according to FIG. 1, " " is coded as 6. Because " " occupies 4 corners, three "0" are added after the 6, e.g., the remaining part " " is coded as 6000. Therefore " " should be coded as 296000. More examples are given in FIGS. 5(A), 5(B), 5(C) to show how the six-digit code is derived.

For certain Chinese characters, there are also special ways of coding apart from its regular code. For instance, the character which should be coded '805000' but may be mistakenly coded '568050', treating it as a character that has no Bushou. In this system, another code for this character has been created which is '000365' meaning 365 days. Therefore all three of these codes will retrieve the character from the machine. To repeat the previous characters is an often seen part of Chinese phraseology, for instance: 人人 , . The second 人 or need not be written for the second time in the system. Just by punching '99' and enter. The second same character — in fact any character can be worked in the same way — will appear on the screen. Further simplification is achieved by keying in one '0'.

Whenever one six-digit numeral can be fit into two or more than two Chinese characters, the following method is used to avoid duplication:

(a) The encoded character of this system is reserved for the most frequently used character.

(b) The second most frequently used characters is to be of a larger number by + 1, thus forming a new numeral. For instance, the code numeral '296010' is and the character should also be coded '296010'. In order to avoid duplication, the character is coded '296011'.

When its simplified form and a regular type characters have the same numeral code, the code for the simplified form is always a bigger number by + 1. For instance, both 舟 and 舟 should be coded '121080'. Since 舟 is a simplified character, it is coded '121081'.

In case the + 1 process has been missed, and the document has already been dispatched, the error is not difficult for the receiver to discover since characters of consecutive numbers generally have no relation to their meaning within the text.

If an error is made in identifying the Bushou, this will also not create a problem, because the system has taken such a possibility into consideration. For instance, the character 今 should have 人 as its Bushou and be coded '801050' but traditionally people take 卜 as its Bushou and could possibly code it '258060'. In this system, both codes have been included, very much in the same way as the character 舟 is treated above. This certainly will dispense attempts by the user to locate the character code, which means a savings in time and will accelerate the speed of input into a computer.

The invention of this encoding system has successfully reduced the number of Bushous from 240 to 160 as generally found in Chinese dictionaries. Bushous that have been rendered obsolete are found in FIG. 11.

This system has created six Bushous which have never been recognized previously by anybody, viz: , , , , , . Besides, apart from , , , which are traditionally treated as occupying four corners, two new ones are added, i.e. , . Examples:

| 大 ' | 套 086073 | |
| --- | --- | --- |
| | 夸 087120 | |
| | 087121 | (舟 is the Japanese version of the Chinese character 舟 ) |
| | 秋 087122 | |
| | 丞 087760 | |
| ' ' | 二 110000 | |
| | 三 111000 | |
| | 丰 112002 | |
| | 羞 112073 | |
| | 壬 112100 | |
| | 隹 112340 | (regular code:411073) |
| '十' | 232720 | |
| | 232790 | |
| | 232780 | |
| 'ᴜ' | 男 774080 | |
| | 劣 775080 | |
| '…' | 北 821010 | |
| | 有 821022 | |
| | 帛 821060 | |
| | 火 821000 | |
| | 玉 826060 | ( 户 the Japanese way of writing Chinese 户 ) |
| '-' | 字 903740 | |
| | 宇 903773 | |
| | 宅 903721 | |

The total number of Chinese characters is approximately several tens of thousands, whereas the number of 6-digit codes can amount to 999999 which far exceed the number of Chinese characters. Thus, depending on how the "Bushou" is broken up using this invention, the system of one code to one character is achieved and the problem of computer input and telecommunication is solved.

Since both the Bushou's code and the code of the remaining part are determined according to the same rule shown in FIG. 1, the codes for the characters are logical and are easy to memorize. Anyone using the present invention can immediately write down a code (i.e., the 6-digit code) of any Chinese character by only keeping the present invention's Bushou codes and the rule of FIG. 1 in mind.

For chinese rare character, for Bushons themselves, for unclassified regular type and aberrant characters, for unclassified simplified characters, we use the following method. Also, in Japanese, about 2000 Kanji (characters) are in use at present. The following 6-difit coding are also used for Kanji in computer input. The methods is that, some of the blanks in FIG. 4 are utilized for their indication and are placed at the beginning of a numeric code. Then the character itself is coded according to its four-coener index. For instance, '54' is adopted for the first two digits for rarely seen characters. Those of regular type and aberrant form in which no Bushou can be identified, the first two digits should be '56' and those simplified forms whose Bushou can also not be identified, the first two digits should be '57'. As to those characters which are Bushous themselves or so called 'Brushou characters', it is stipulated that '55' should be the first two digits and so forth. For Japanese Kanji, '53' is adopted for the first two digits. These numerals do have meanings in the following sense. '5' is in the center between 1 and 9 and is a blank in FIG. 4 of this system, so it is used to indicate special kinds of characters; '4' is homonymous with 死 (si) which means 'no active life'; '7' is homonymous with 简 (jian) which means 'simple' and '6' is homonymous with 有 (iu) which means 'common', the two-digit '53' is homonymous with first two characters of a Japanese expression ごさんこう which reads gosanko and means 'for your reference'. As Bushou is the center of this system, the first two digits for such character Bushous is therefore '55'.

Also, many Kanas (Katakana and hiragana) are in use in Japan. For these Kanas, the 6-digit coding method is applied using this invention. The codes of Japanese Katakana and hiragana are shown in FIGS. 8A and 8B.

Using the Japanese Syllabary as its base, the first Kanas of each row takes '1' as its last or sixth digit and that of the last or sixth digit of the fifth Kana must be '5'. The first two digits are fixed at '65' for Katakana, and '69' for Hiragana. The third ciphers of every row is invariably '0', then the fourth digit takes '0 ' for Seion, '1' for Dakuon and '2' for Handakuon. The fifth digit is to indicate 'row'. Therefore for the first ア row, it is to be '0', and for the tenth ワ row, '9'. Consequently, the Katakana ナ is coded '650041', and イ is coded '690151'.

For example, the code of "ア" is 650001, and that of "ア" is 650005. The following are examples of some sentences: "これはとうざくらです" (English translation "This is oriental cherry") are is encoded as 690015 690084 690051 690021 690013 690081 690134 690023. "北京にはバスがおおい" (English translation "There are a lot of buses in Beijing") is encoded as 531211 530090 690134 690051 650151 650023 690111 532720 690002, among which the 3 characters "北京に" are encoded as 531211 530090 532720, the 2 katakanas are encoded as 650151 650023, and the 4 hiragana are encoded as 690134 690051 690111 690002. After inputting the data, the corresponding Japanese will be displayed on the screen.

The encoding of punctuation marks in this system is shown in FIG. 9. Generally in this case the last digit of a six-digit code, '1' is always for an opening quotation, while '9' is for the closing quotation and '5' for symbols that stay more or less in the middle. '0' as the last digit is generally used in the frequently used punctuation mark.

Numerals 1 to 9 are obtained in two different ways: if it is a numeral character of the Chinese language, such as '九' five '0' are to precede the numeral, thus forming a six-digit code. For instance, the code for 九 is '000009'. If it is an arabic numeral, the predetermined indicator, is '15' and therefore the code of arabic 9 is '150009'. The encoding o: mathematical symbols are shown in FIG. 10.

As to western languages, 6-digit codes are also applied. Procedures of inputting are the same as Japanese. For example, inputting the codes 052000 058181 058886 054061 051881 058686 051881 052003 058886, the sentence "I get a cake" will appear on the screen. The method and operation are very simple. Since the same method can be used for other languages, it is unnecessary to provide more examples.

Under this four-corner pattern classificiation, one need not know the writing sequence of the strokes. User of the system has just to make out the six-digit numeral code basing on the pattern of the character, and do the input, which is very convenient for input into a computer. It is specifically useful for and manageable to any foreigners to whom Chinese characters are not indigenious.

Basing on the concept and devices of this coding system, the codes obtained can be used for confidential communication, since one uses merely six ciphers for any of the Chinese characters and punctuation marks. A prearrangement of changing the numerals or to be exact, exchanging the position of one to three ciphers in the six-digit numeral will put this into effect. One can also adopt the device of using different prearragement for different dates. Modern Chinese writing needs punctuation marks which can also be represented by six-digit numerals. Since no separate keys are required for punctuations and actual numerals, the system is therefore more than suitable for confidential communication.

Basing on this system, the inventor has already compiled the code of more than 9,000 characters without having recourse to duplicating any code number and still provides the user with the convenience of creating new characters and encoding new numbers for his private use which is of course to be prearranged with the receiver-to-be in communication, by utilizing the blank pairs of numerals in the Bushou List (see FIG. 4) as the indicator, and the last four digits are to be taken from the four corners of this character. Although the new codes are determined by the user, they are still logical and easy to remember. For instance, one can code the rare surname 軰 by assigning '912723' to it.

This invention is adaptable to character groups or phrases but still uses only several ciphers, for instance, a six-digit numeral. First, take the upper two corners of the first character and then the lower two corners of the last character in the phrase, from each two corners take two digits thus forming the first four-digit of a six-digit numeral; the last two digits are to be predetermined as a serial number. This is the characteristics of the character group or phrase-coding in this system.

The present invention can also be used for confidential communication by exchanging the positions of the encoded six digits in a predetermined order.

The "ANN TSE KAI Character Writer" has a simple structure. It can input and output various kinds of languages, especially Chinese characters. This machine has many functions and has a special small keyboard that also makes single-hand operation possible. apart from the functions of inserting and deleting words and editing passages as an ordinary word processor, the information can be stored on magnetic tape, printed out or output over ordinary telephone lines. Through digital inputting and encoding many languages, the character writer can output these languages. For example, the encoding of Chinese characters as described above are logical and easy to memorize. Each character corresponds to one code and the code will not be the same for different characters. Thus, complicated Chinese characters are easy to input into the computer. Use of the present invention's system of encoding will be accurate for telecommunication of Chinese characters. The present invention can also be used for encoding other languages.

Figure 6:
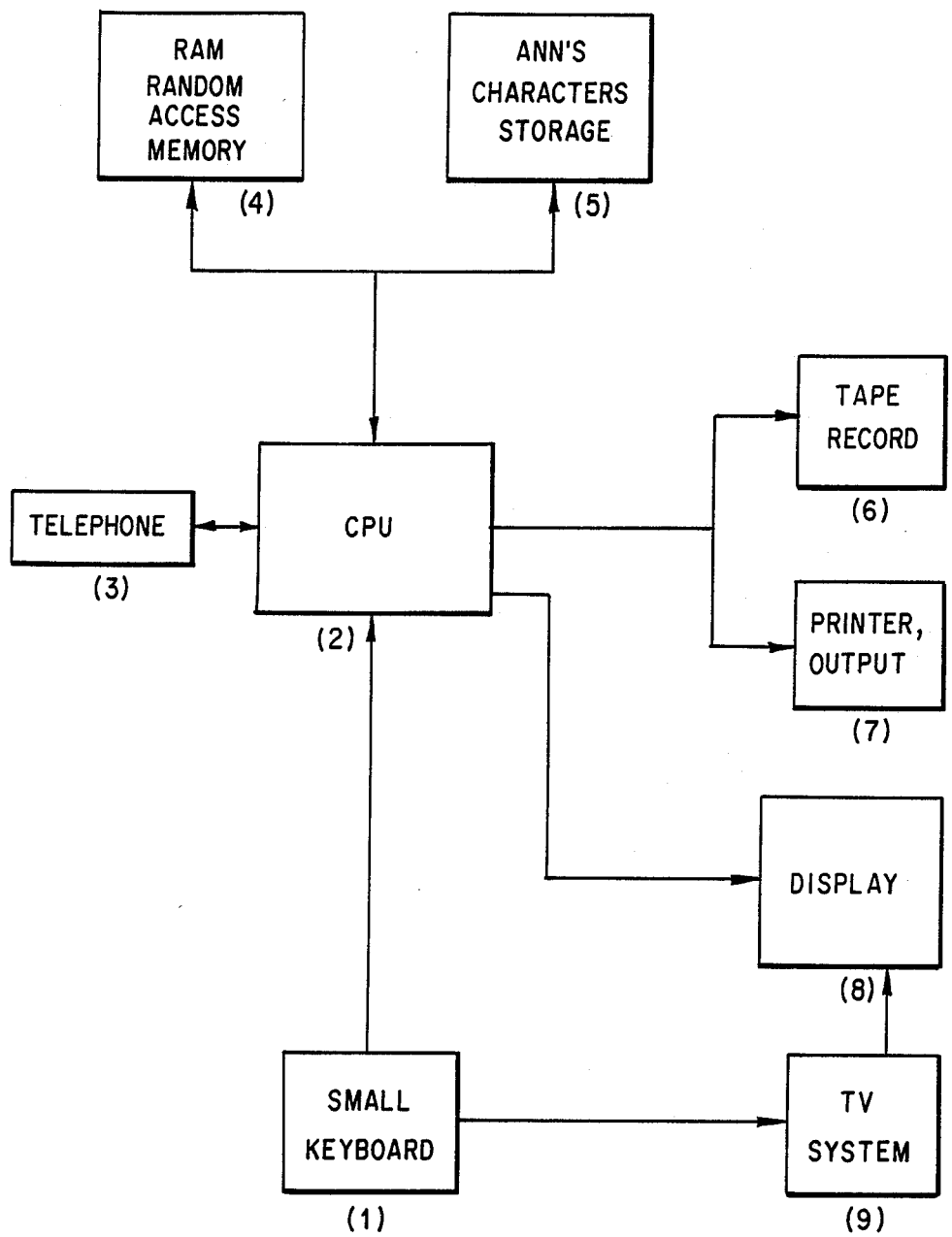
FIG. 6 is a block diagram of ANN TSE KAI Character Writer.

The machine of this invention is shown in the block diagram in FIG. 6 which comprises: a small keyboard (1) for data entry, a CPU (2) for general central processing and control, ANN's character storage (5) containing all the coded characters and words of the different languages, a RAM (4) for random access memory, a tape record or tape drive (6) for recording whatever the operator wishes to store on tapes, a printer (7) or output (7), through which the information can be output, a display (8) which is usually a CRT screen for showing the input contents and for use as a TV system (9), TV system (9) is an additional portion, which can receive local TV programs and which is an additional use of this Character Writer, and telephone (3) for communication with other computer data storages. The telephone (3) can be used for inputting and outputting information through telephone line as well as for functioning with a telex machine. Data is first input from the keyboard (1). The CPU (2) analyzes the input information and automatically searches the Ann's character storage (5). The stored information is then input to the CPU (2). If the code entered is correct, the word will be displayed on the screen (8). If the code entered does not have a corresponding character, then the phrase "no such word" will be displayed on the screen (8). The input data will be stored temporarily in RAM (4). When the data input is completed, the input data can again be checked by being displayed rapidly or gradually on the screen through the CPU which is controlled by the keyboard. The input data may need to be corrected, supplemented, or reedited. The finalized data can be printed out by the printer (7) or stored on ordinary magnetic tape by the tape record (6) or the data may be sent to a far away device through the telephone (3) and the output (7). FIG. 6, however, merely shows the information is transmitted inside the machine.

Figure 7A:
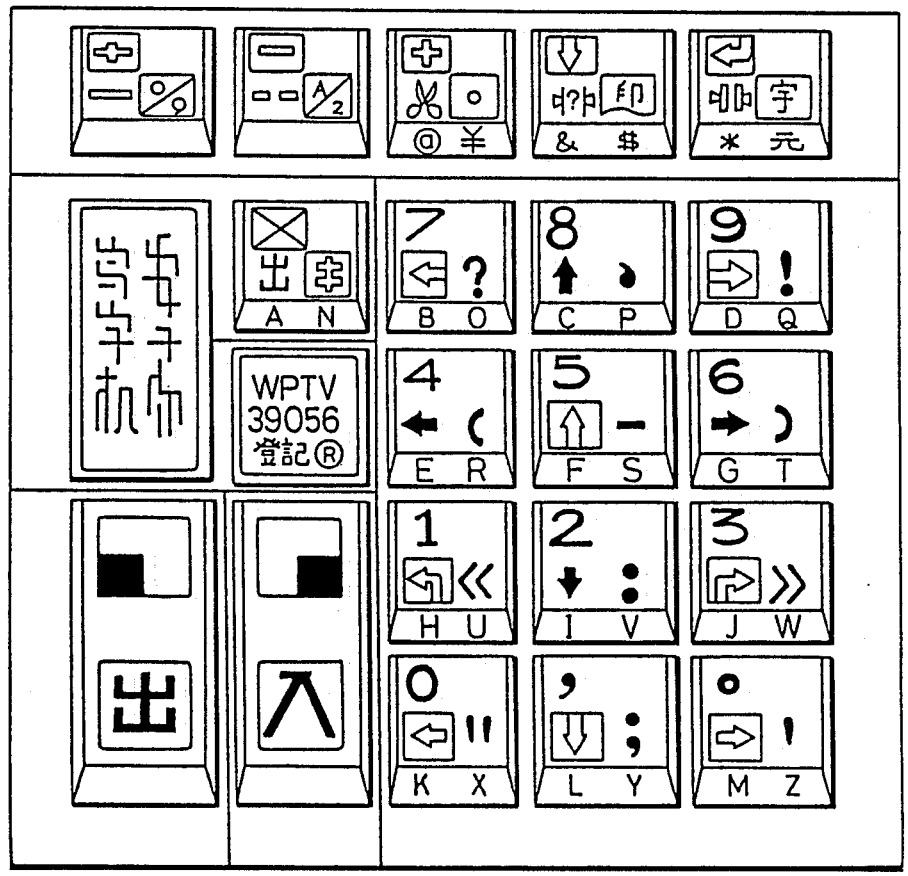
FIGS. 7A–7B are the keyboard of the ANN TSE KAI Character Writer.
Figure 7B:
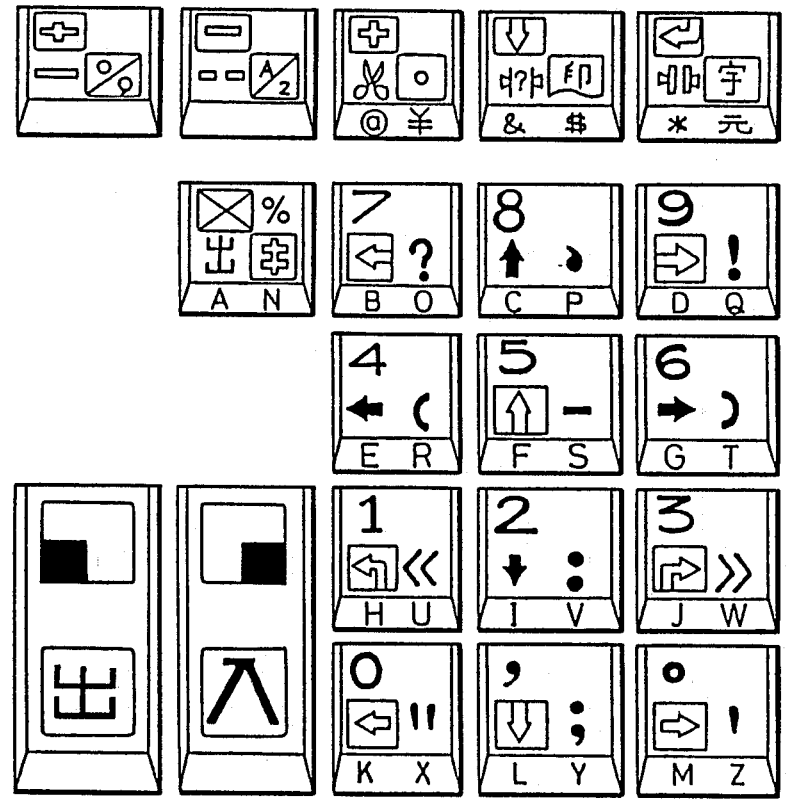

One embodiment of the special mini-type keyboard (1) is shown in FIG. 7(A) and 7(B). The keyboard is constructed with only ten digital keys 0-9, eight functional keys and two large main keys. FIG. 7(A) is a larger drawing of FIG. 7(B). The empty space in FIG. 7(B) is for the Chinese mark of the machine name shown in FIG. 7(A). The two large main keys provide multi-control of the digital keys other functional keys. Thus, every key in the keyboard has three or more functions. Each key contains several symbols to show the different functions of the key.

Thus, each key has three or more functions, regardless of whether the key is a digital or functional key.

Three or more functions can be attained through multi-level control of the keys. This is achieved through combination of keys with the two large main keys.

At the lower left corner of the keyboard, in FIG. 7(B), are two large main keys, ⌂ and ⌂. The two large keys control all input and output and are therefore used most. In order to increase the efficiency, they are to be pressed with the left portion of the right thumb, so as to be pressed together with the other keys. The other function keys are also used in combination with these two large keys.

As shown on the diagram of the keyboard, every key contains more than one symbol. Actually, there are at least three symbols on one key, representing three different functions. Similarly, those with five symbols have five functions. Some of their functions are illustrated as follows.

Keys running vertically are in a row. In the cited example, there are five rows on the keyboard. Counting from top to bottom, when the key is in the nth place, it is called the nth key (FIG. 7B). The keys and their functions will be identified starting from the left.

When the keyboard of the invention is on a first function level, the bright spot or 'cursor' on the screen of the Character Writer indicates the place where the next character will appear when the right code is entered.

The 2nd, 3rd, 4th, 5th keys of the third row, i.e. the keys that have the numerals 7, 4, 1, 0 appearing on the upper left corners; the 2nd, 3rd, 4th keys on the fourth row, i.e. the keys that have the numerals 8, 5, 2 on the left upper corners; and the 2nd, 3rd and 4th keys of the fifth row, i.e. those which have the numerals 9, 6, 3 on the left upper corners, are the ten numeral keys to be used for inputting the six-digit codes of characters. After entry, the particular character will appear on the screen. Continuance of the above operation will make up sentences, paragraphs, and eventually an entire document as it is intended. Punching an incorrect digit can be corrected by depressing the second key of the second row. The 5th key of the fourth row can be directly depressed to obtain a 'comma' and the 5th key of the fifth row, to obtain a Chinese sentence ending mark. The 3rd key of the second row is the input key which turns a numeral into a character on the screen and is also used to create space between characters. The first key of the first row is to add spaces in the right direction and the first key on the second row is to cancel the spaces in the left direction. The 1st key on the third row is to facilitate adding one number to the code numeral, for instance, for 123456 to become 1234567. The 1st key of the fourth row is to change pages and the first key of the fifth row is to change lines or to create a new paragraph.

The function of the second layer (or the first shift) of the keyboard of this invention is indicated in the left lower corner of all the keys. The characteristics of the keys in operation is that one must first depress the 2nd key of the first row, i.e. the 'out' key and the other key simultaneously for the indicated function. The following describes the second layer function of all the different keys:

The 1st key of the first row is to add an underline to each of the characters already written. The 1st key of the second row is to erase the already added underline. The simultaneous depression of the 2nd key of the second row together with the 2nd key of the first row is to make the machine function to leave the first shift and second shift which will be described later. The 1st key of the third row is to facilitate editing such as to move certain characters, sentences or paragraphs up or down in any part of the document that has already been written. The 1st key of the fourth row is to carry out a search for certain characters or groups of characters.

The 1st key of the fifth row is to facilitate insertions of unlimited length. The 3rd key of the third row, 2nd and 4th keys of the fourth row and the 3rd key of the fifth row are to move the cursor on the screen in the direction of the arrow as indicated to the place where some functional operation is required. The 5th key of the third row is to move the cursor forward to the place where a previous punctuation mark exists. The 5th key of the fifth row is to move the cursor to the next punctuation mark. The 4th key of the third row is to move the cursor to the previous paragraph and the 4th key of the fifth row is to move the cursor to the next paragraph. The 2nd key of the third row is to move the cursor to the previous page. The 2nd key of the fifth row is to move the cursor to the next page. The 3rd key of the fourth row is to move the cursor to the beginning of the document the 5th key of the fourth row is to move the cursor to the end of the document.

The third layer (or the second shift) functions of the function keys are indicated on the right lower corner of the keys. The operation requires simultaneously depression of the 3rd key on the second row, i.e. input key, and the 2nd, 3rd, 4th and 5th keys of the third row and the 2nd, 3rd, 4th and 5th keys of the fourth row and the 2nd, 3rd, 4th, 5th keys of the fifth row. These are all punctuation mark keys. A simultaneous depression of the 2nd key and the 3rd key of the second row are to first view the Chinese phrase. By holding the 3rd key and effect a second depression of the 2nd key of the second row, a second phrase will appear on the screen, and so on, till the desired phrase appears. A second depression of the 3rd key will add the phrase to the text of the document.

The fourth layer and fifth layer functions are for English capital letters and for sings of •, ʼ, ı, ı̣, •, ι̣, through pressing the big key and one function key and the relatived signed key.

For example, if the keys ⌂ and ⌂ are pressed simultaneously and if the first key of row 4 is pressed afterwards, the sign "$" will be displayed.

An additional example is if the keys ⌂ and ⌂ are pressed simultaneously and then the first key of row 5 is pressed afterwards, the sign " ι " will be displayed.

Finally, if the keys ⌂ and ⌂ are pressed simultaneously and then the second key of row 3 is pressed, the arabic numeral 7 will be displayed.

The keys for data entry of this keyboard are all indicated by numbers, which are well-known. Unlike the arrangement of alpha-numerical characters on an alpha-numeric keyboard, which is difficult for beginners to learn, the digital keyboard of the present invention is easy to master by anyone. Furthermore, since the distance between the keys is short, the digital keyboard can be operated with only one hand. Therefore, the other hand can be reserved for other purposes such as holding a cup. The time required to operate the keyboard is reduced and thus the input speed will be raised. When the user is adept in operating the keyboard, the digits can be simultaneously pressed as if a reflex action. The input efficiency will also be improved in this way.

Every key on the keyboard is indicated by a functional symbol for the convenience of the operator. For example:

The digit on the key indicates the digit which can be typed.

The punctuation on the key indicates the punctuation which can be typed.

The capital letter on the key indicates the capital letter which can be typed directly.

The arrow symbols indicate that the words and paragraphs can be moved forward, backward, leftward and rightward for editing purposes.

The large keys are the main control keys.

These symbols are easy to memorize so that the machine is easy to operate.

These functions can be obtained through appropriate arrangement of the keyboard and the central processing unit.

Because of its simple construction, the word processing machine is light weight and can be manufactured as a portable unit. Thus, the machine is only as large as an ordinary alpha-numeric typewriter and is therefore convenient to carry. Due to the 6-digit method of encoding, input and output of various languages is possible even though there may be a need to depress more keys.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed:

1. A method of encoding a language comprising:
defining language characters as patterns where each pattern may be a stroke, a number of strokes or no strokes;
defining said patterns into at least ten classes each class comprising a main pattern and at least one subordinate pattern, said main pattern and subordinate patterns being defined in FIGS. 4(a)-4(h);
assigning one digital number to correspond to each main and subordinate pattern;
assigning a digital number zero if no stroke exists in one of four parts of the main and subordinate pattern;
dividing the language character into first and second portions;
defining the first portion into an upper part and a remaining part;
comparing said upper part to each of said main and subordinate patterns in FIGS. 4(a)-4(h) to determine a match;
assigning a first digital number to said upper part equal to the digital number of a matched main and subordinate pattern;
comparing said remaining part to each of said main and subordinate patterns in FIGS. 4(a)-4(h) to determine a match;
assigning a second digital number to said remaining part equal to the digital number of a matched main and subordinate patterns and, if no match exists assigning a digital number zero;
encoding said first portion into a two digit code by assigning said first digital number to a left digit of said two digit code and assigning said second digital number to a right digit of said two digit code;
defining said second portion into four portions, said four portions being an upper left corner, an upper right corner, lower left corner and lower right corner;
comparing said upper left corner to each of said main and subordinate patterns in FIGS. 4(a)-4(h) to determine a match;
assigning a third digital number to said upper left corner equal to the digital number of a matched main and subordinate pattern;
comparing said upper right corner to each main and subordinate patterns in FIGS. 4(a)-4(h) to determine a match;
assigning a fourth digital number to said upper right corner equal to the digital number of a matched main or subordinate pattern;
comparing said lower left corner to each main pattern and subordinate pattern in FIGS. 4(a)-4(h) to determine a match;
assigning a fifth digital number to said lower left corner equal to the digital number of a matched main and subordinate pattern;
comparing said lower right corner to each main and subordinate pattern in FIGS. 4(a)-4(h) to determine a match;
assigning a sixth digital number to the lower right corner equal to the digital number of a matched main and subordinate pattern;
encoding said second portion into a four digit code by assigning said third digital number to a left most digit, assigning said fourth digital number to a digit to the right of the third digital number, assigning the fifth digital number to the digit to the right of the fourth digital number and assigning the sixth digital number to the right most digit of the four digit code;
encoding said character by combining said two digit code and said four digit code to form a six digit code by assigning said two digit code to the left most first and second digits of the six digit code and assigning the four digit code to the right most digits of the six digit code;
avoiding duplication of six digit codes when two or more language characters form the same six digit code by encoding the language character in the six digit code for a first language character as above and encoding a second language character by incrementing the right most digital number of the six digit code by one.

2. A method of encoding a language according to claim 1, wherein said characters are Chinese characters, said first portion is a Bushou and said second portion is a remaining portion.

3. A method of encoding a language according to claim 2, wherein said Chinese characters have four corners, said Bushou occupying at least two of said four corners.

4. A method of encoding a language according to claim 1, wherein said language is any one of Japanese, Chinese, Korean, Greek, Russian, Spanish, French, German, or English.

5. A method of encoding a language according to claim 1 further comprising exchanging the positions of the digits within said encoded character for confidential communication.

* * * * *